United States Patent
Books et al.

(10) Patent No.: US 12,151,561 B2
(45) Date of Patent: Nov. 26, 2024

(54) SYSTEMS AND METHODS FOR PLUG-IN ELECTRIC VEHICLE ACCESSORY RECHARGING DURING BATTERY CHARGE

(71) Applicant: Cummins Inc., Columbus, IN (US)

(72) Inventors: Martin T. Books, Columbus, IN (US); Richard A. Booth, Columbus, IN (US); Erik L. Piper, Columbus, IN (US); Patrick Sill, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 19 days.

(21) Appl. No.: 18/094,817

(22) Filed: Jan. 9, 2023

(65) Prior Publication Data

US 2023/0142941 A1    May 11, 2023

Related U.S. Application Data

(63) Continuation of application No. 16/922,381, filed on Jul. 7, 2020, now Pat. No. 11,548,391, which is a (Continued)

(51) Int. Cl.
  B60L 1/08    (2006.01)
  B60K 1/00    (2006.01)
  (Continued)

(52) U.S. Cl.
  CPC .................. B60L 1/08 (2013.01); B60K 1/00 (2013.01); B60K 17/02 (2013.01); B60L 1/003 (2013.01);
  (Continued)

(58) Field of Classification Search
  CPC .. B60L 1/08; B60L 53/00; B60L 58/12; B60L 58/16; B60L 58/26; B60L 1/003;
  (Continued)

(56) References Cited

U.S. PATENT DOCUMENTS 5,555,737 A    9/1996 Takeo et al.
5,633,577 A *  5/1997 Matsumae ............ H02J 7/0013
                                                 320/138
(Continued)

FOREIGN PATENT DOCUMENTS

CN    103733467 A    4/2014
CN    107074122 A    8/2017
(Continued)

OTHER PUBLICATIONS

EPO Search Report for Application No. EP 19735906.0 mailing date Feb. 4, 2022, 16 pages.
(Continued)

*Primary Examiner* — Suresh Memula
(74) *Attorney, Agent, or Firm* — Foley & Lardner LLP

(57) ABSTRACT

Systems and methods to control an electric vehicle accessory of an electric vehicle during a charge event are provided. An apparatus includes a controller communicatively coupled to a battery and an electric vehicle accessory. The controller is structured to: receive a battery power limit from the battery management system; receive an indication that the battery is undergoing the charge event; and cause the electric vehicle accessory to recharge by absorbing energy from a charging station during the charge event.

20 Claims, 7 Drawing Sheets

Related U.S. Application Data continuation of application No. PCT/US2019/012513, filed on Jan. 7, 2019.

(60) Provisional application No. 62/639,269, filed on Mar. 6, 2018, provisional application No. 62/614,825, filed on Jan. 8, 2018.

(51) Int. Cl.
  *B60K 6/28*      (2007.10)
  *B60K 17/02*     (2006.01)
  *B60L 1/00*      (2006.01)
  *B60L 53/00*     (2019.01)
  *B60L 58/12*     (2019.01)
  *B60L 58/16*     (2019.01)
  *B60L 58/26*     (2019.01)

(52) U.S. Cl.
  CPC .............. *B60L 53/00* (2019.02); *B60L 58/12* (2019.02); *B60L 58/16* (2019.02); *B60L 58/26* (2019.02); *B60K 2001/005* (2013.01); *B60K 6/28* (2013.01); *B60Y 2200/91* (2013.01); *B60Y 2200/92* (2013.01); *B60Y 2300/91* (2013.01)

(58) Field of Classification Search
  CPC . B60K 1/00; B60K 17/02; B60K 6/28; B60K 2001/005; B60Y 2200/91; B60Y 2200/92; B60Y 2300/91
  USPC ......................................................... 320/109
  See application file for complete search history.

(56) References Cited

U.S. PATENT DOCUMENTS

| | | | |
|---|---|---|---|
| 5,668,463 A * | 9/1997 | Duley | H02J 7/342 307/66 |
| 5,982,152 A | 11/1999 | Watanabe et al. | |
| 7,622,895 B1 * | 11/2009 | Griffin | H02J 7/0049 320/132 |
| 7,725,275 B2 | 5/2010 | Zhang et al. | |
| 7,928,736 B2 | 4/2011 | Yun et al. | |
| 8,408,341 B2 | 4/2013 | Dalum et al. | |
| 9,007,033 B2 | 4/2015 | Li | |
| 9,126,544 B2 | 9/2015 | Larson et al. | |
| 9,190,868 B2 * | 11/2015 | Gale | H02J 7/04 |
| 9,340,090 B2 * | 5/2016 | Fukatsu | B60L 53/62 |
| 9,352,635 B1 | 5/2016 | Schepmann et al. | |
| 9,625,528 B2 | 4/2017 | Nugent et al. | |
| 9,714,984 B2 | 7/2017 | Kim | |
| 9,766,297 B2 | 9/2017 | Frost et al. | |
| 9,766,298 B2 | 9/2017 | Lennevi et al. | |
| 9,772,382 B2 | 9/2017 | Walter et al. | |
| 11,840,153 B1 * | 12/2023 | Namuduri | B60L 53/62 |
| 2009/0218983 A1 * | 9/2009 | Loudot | H02J 7/35 320/101 |
| 2010/0072953 A1 * | 3/2010 | Mitsutani | B60L 58/15 320/152 |
| 2011/0234150 A1 * | 9/2011 | Furukawa | B60L 53/51 320/101 |
| 2012/0280646 A1 | 11/2012 | Gale et al. | |
| 2013/0264867 A1 | 10/2013 | Mitsutani | |
| 2015/0006008 A1 | 1/2015 | Wei et al. | |
| 2015/0100188 A1 | 4/2015 | Wagner et al. | |
| 2015/0274097 A1 | 10/2015 | Holub et al. | |
| 2016/0134157 A1 * | 5/2016 | Maeno | H02J 7/35 320/101 |
| 2017/0067967 A1 | 3/2017 | Bryngelsson et al. | |
| 2017/0088003 A1 * | 3/2017 | Yu | B60W 10/08 |
| 2017/0136891 A1 | 5/2017 | Ricci | |
| 2017/0274783 A1 * | 9/2017 | Kuribara | H02P 27/06 |
| 2018/0043788 A1 * | 2/2018 | Kuribara | B60L 8/003 |
| 2018/0290645 A1 * | 10/2018 | Zhao | B60W 50/0097 |
| 2018/0361865 A1 * | 12/2018 | Bando | B60L 53/30 |
| 2020/0164763 A1 * | 5/2020 | Holme | B60L 58/16 |
| 2020/0180462 A1 * | 6/2020 | Ando | B60L 53/60 |
| 2020/0274375 A1 * | 8/2020 | Griffiths | H02J 7/24 |
| 2021/0336485 A1 * | 10/2021 | Narampanawe | H02J 50/12 |

FOREIGN PATENT DOCUMENTS

| | | | |
|---|---|---|---|
| CN | 107215217 A | 9/2017 | |
| JP | 2008-028912 A | 2/2008 | |
| WO | WO-2015/049436 A2 | 9/2014 | |
| WO | WO-2017/064582 | 4/2017 | |
| WO | WO-2017064582 A1 * | 4/2017 | ............... B60K 1/00 |
| WO | WO-2017/099649 | 6/2017 | |
| WO | WO-2017099649 A1 * | 6/2017 | ............. B60L 50/50 |
| WO | WO-2019/136366 | 7/2019 | |
| WO | WO-2019136366 A1 * | 7/2019 | ............... B60K 1/00 |

OTHER PUBLICATIONS

Foreign Search Report on EP 19735906.0 DTD May 6, 2022.
International Search Report and Written Opinion for International Application No. PCT/US2019/012513, mail date May 10, 2019, 12 pages.
Notice of Allowance on U.S. Appl. No. 16/922,381 DTD Mar. 17, 2022.
Notice of Allowance on U.S. Appl. No. 16/922,381 DTD Aug. 18, 2022.
US Office Action on U.S. Appl. No. 16/922,381 DTD Dec. 6, 2021.
CN Office Action dtd Jan. 30, 2023 re Appl No. 201980007691.9 with English translation.
CN Search Report dtd Jan. 29, 2023 re Appl No. 201980007691.9.

* cited by examiner

SYSTEMS AND METHODS FOR PLUG-IN ELECTRIC VEHICLE ACCESSORY RECHARGING DURING BATTERY CHARGE

CROSS REFERENCES TO RELATED PATENT APPLICATIONS

This application is a continuation of U.S. patent application Ser. No. 16/922,381, filed Jul. 7, 2020, which is a continuation of International Application No. PCT/US2019/012513, filed Jan. 7, 2019, which claims priority to U.S. Provisional Patent Application No. 62/614,825 filed Jan. 8, 2018 and U.S. Provisional Patent Application No. 62/639,269 filed Mar. 6, 2018, all of which are incorporated herein by reference in their entireties.

TECHNICAL FIELD

The present disclosure relates to electric vehicle systems and hybrid vehicle systems. More particularly, the present disclosure relates to systems and methods for charging, battery systems of electric and hybrid vehicle systems, and recharging an electric vehicle accessory of an electric vehicle or hybrid vehicle during a charge event.

BACKGROUND

An electric vehicle is a vehicle that uses an electrical motor to move or propel the vehicle. The electric vehicle may be a plug-in vehicle powered solely by battery. Some electric vehicles, such as a hybrid electric vehicle (HEV) or a plug-in hybrid electric vehicle (PHEV) are powered in part by battery. In general, the electric vehicle should have enough electric energy to complete a mission that includes both driving a prescribed route as well as running all the other electrical devices on the vehicle while on. Electric vehicles and hybrid vehicles are increasing in popularity and systems that provide improved fuel efficiency and an improved user experience are desirable.

In order to operate the various systems and components of an electric vehicle, the electric energy may be provided by or otherwise taken from the battery or a portable energy supply. However, in the course of a day, there are limited opportunities to connect to the grid to replenish the supply of portable energy. Therefore, there exists a need to recharge an electric vehicle accessory of an electric vehicle during a charge event. Having the ability to recharge the electric vehicle accessory during a charge event advantageously extends the charge range of the battery, improves the utilization of untapped charging station capacity, and improves the use of that capacity to top-off accessory loads of an electric vehicle for future usage.

Improving the charging time and amount of charge accepted by a battery during recharging events is desirable. Currently, during a normal recharge cycle, a battery management system will broadcast a current or power limit of a battery to a charging source. The flow of power from the charging source is then limited to the broadcasted current or power limit.

SUMMARY

One embodiment relates to an apparatus structured to control an electric vehicle accessory of an electric vehicle during a charge event. The apparatus includes a controller communicatively coupled to a battery and an electric vehicle accessory. The controller is structured to determine that the battery of an electric vehicle is undergoing a charge event. Based on determining that the battery of the electric vehicle is undergoing the charge event, the controller is structured to place the electric vehicle accessory in an on-state during the charge event, and cause the electric vehicle accessory to recharge by absorbing energy from the charging station during the charge event.

Another embodiment relates to a method that includes determining, by a controller of an electric vehicle, that a battery of the electric vehicle is undergoing a charge event, and based on determining that the battery of the electric vehicle is undergoing the charge event, placing, by the controller, an electric vehicle accessory in an on-state during the charge event, and causing, by the controller, the electric vehicle accessory to recharge by absorbing energy from a charging station during the charge event.

Another embodiment relates to an apparatus that includes a battery defining a battery power limit, an accessory device defining a parasitic power load, and a hybrid control circuit coupled to the battery and the parasitic load. The hybrid control circuit is structured to determine a total power limit based on the battery power limit and the parasitic power load, broadcast the total power limit to a charging source, and distribute power received from the charging source so that the battery receives power up to the battery power limit while the parasitic power load is satisfied.

These and other features, together with the organization and manner of operation thereof, will become apparent from the following detailed description when taken in conjunction with the accompanying drawings.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for charging a hybrid power system. The various concepts introduced above and discussed in greater detail below may be implemented in any number of ways, as the concepts described are not limited to any particular manner of implementation. Examples of specific implementations and applications are provided primarily for illustrative purposes.

Referring to FIGS. 1-5, the various embodiments disclosed herein relate to systems, apparatuses, and methods for charging a hybrid power system. A charging system includes a battery management system in communication with a battery to determine a state-of-charge and a state-of-health of the battery. The battery management system is structured to determine a current limit or a battery power limit of the battery. A hybrid control circuit is structured in communication with the battery management system, a charging source, and parasitic systems connected to the battery. The hybrid control circuit is structured to receive the battery power limit, and determine a parasitic load of the parasitic systems. The hybrid control circuit is further structured to determine a total power limit as a sum of the battery power limit and the parasitic load and to communicate the total power limit to the charging source. The charging source then provides power up to the total power limit so that the battery is charged at the battery power limit.

Figure 1:
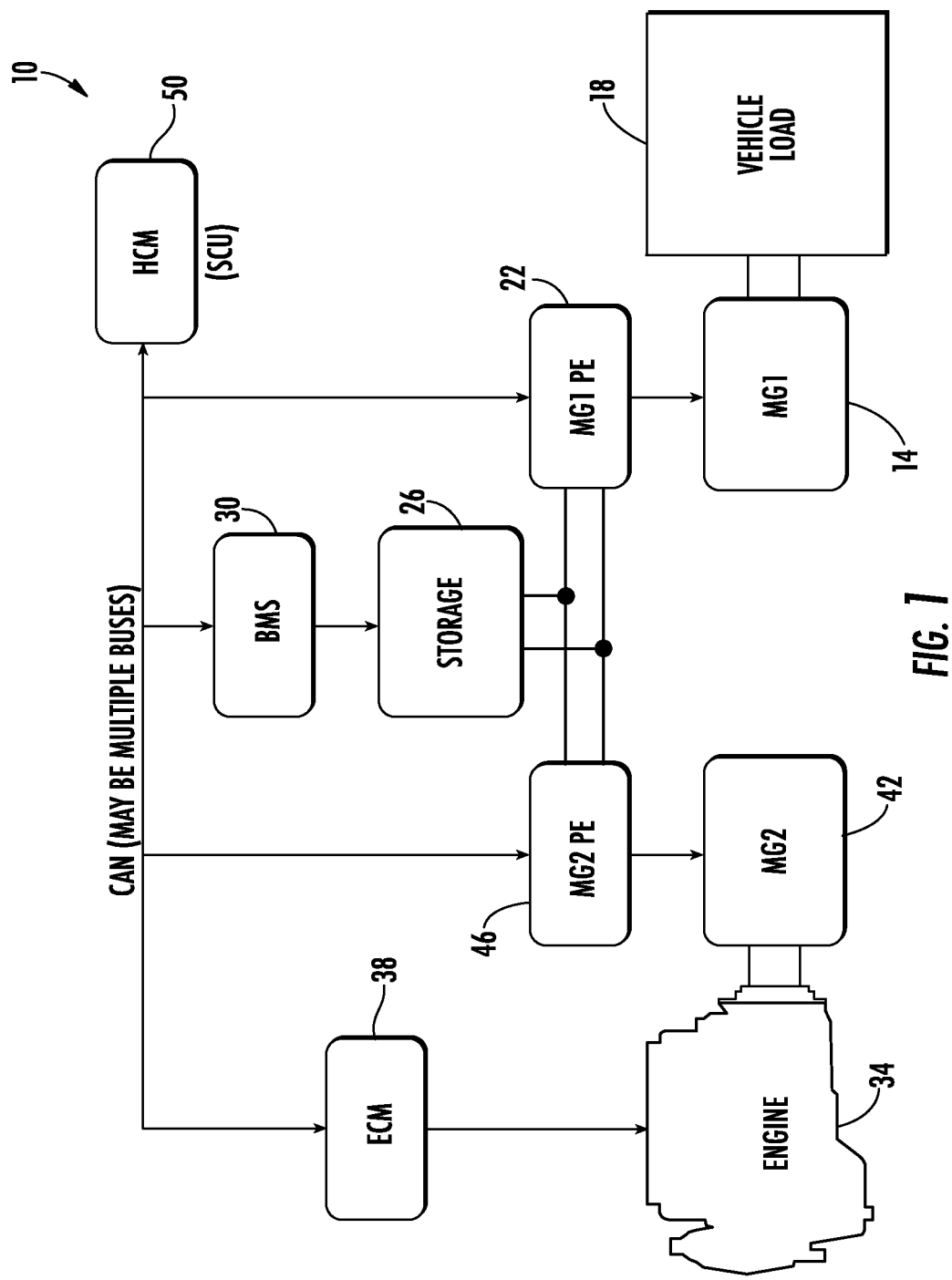
FIG. 1 is a schematic representation of a series hybrid power system according to some embodiments.

As shown in FIG. 1, a hybrid power system 10 may be arranged to drive or propel a vehicle (e.g., a bus, an automobile, etc.) over the ground via a motor-generator in the form of a traction motor 14 structured to drive a vehicle load 18. In some embodiments, the vehicle load 18 includes power required to propel the vehicle, operate HVAC compressors, fans, pumps, a power steering pump, electric lighting, service brake air compressors, etc. The traction motor 14 is controlled by a motor-generator power electronics in the form of an inverter 22 receiving power from an energy storage system in the form of a battery 26. In some embodiments, the power to operate the HVAC compressors, fans, pumps, power steering pump, electric lighting, service brake air compressors, etc. is drawn directly from the battery 26. A battery management system 30 is structured in communication with the battery 26 and communicates with the battery to determine a state-of-health of the battery 26 and a state-of-charge of the battery 26. The state-of-health represents a total percent of the battery's 26 total life that has not been consumed to date. When the battery 26 is new the state-of-health is one-hundred percent (100%) and when the battery 26 must be replaced the state-of-health is zero percent (0%).

The hybrid power system 10 also includes a prime mover in the form of an internal combustion engine 34 that is controlled by an engine control circuit 38. In some embodiments, the engine 34 is a gasoline spark ignition engine or a diesel engine. The engine 34 is coupled to a motor-generator in the form of a generator 42 structured to produce electricity when powered by the engine 34. The generator is coupled to the battery 26 via a motor-generator power electronics in the form of a regulator 46.

A hybrid control circuit 50 (i.e., a system control unit, a hybrid control circuit, or a system control circuit) is structured in communication with the engine control unit 38, the regulator 46, the battery management system 30, and the inverter 22 to coordinate operation of the hybrid power system 10. Additionally, the hybrid control circuit 50 is structured in communication with various real and/or virtual sensors arranged to determine parasitic loads produced by the vehicle load 18. Within this application, the term "parasitic load" refers to power draws on the battery 26 and can include power required to propel the vehicle, operate HVAC compressors, fans, pumps, a power steering pump, electric lighting, service brake air compressors, or any other load that draws power from the battery 26.

The hybrid control circuit 50 provides instructions regarding how much torque or power is required to propel the vehicle via the traction motor 14 and how much power is requested from the engine 34 and the generator 42 to supply the battery 26. In some embodiments, the particular control setpoints of the engine 34 and generator 42 come from the hybrid control circuit 50 and provide a desired electrical power to be generated as well as a desired engine speed. The desired electrical power and the desired engine speed determine how much energy is to be provided to the traction motor 14 from the battery 26 relative to the amount of energy to be provided by the engine 34 and generator 42.

The battery 26 is structured to receive power to replenish its state of charge from three sources. The first source is a stationary recharge from a grid power source. For example, the grid power source may include high power direct current (DC) charging from roof mounted rails via a pantograph, high power DC charging from a plug on side of the vehicle, or alternating-current (AC) charging from plug on side of vehicle (e.g., for overnight charging). The second source is regenerative power produced by the traction motor 14 during braking events. The third source includes recharging while operating or in service from a range extender system in the form of the engine 34 and the generator 42. All three or any combination of the three may be utilized by the vehicle at different times. For example, regenerative energy from the traction motor 14 and energy produced by the engine 34 and generator 42 may be utilized at one time.

All charging sources are subject to current or power limits which are provided by various components of the hybrid power system 10. In particular, the battery 26 defines a battery power limit that is determined by the battery management system 30. The battery power limit is transmitted to the hybrid control circuit 50. The hybrid control circuit 50 then monitors the vehicle load 18, determines the parasitic power load, and determines a total power limit as the sum of the parasitic power load and the battery power limit.

In previous hybrid power systems, the battery power limit was used by the hybrid control circuit to limit other elements in the hybrid power system (e.g., the traction motor, the motor, the generator, or any of the chargers). If the total power limit does not account for the parasitic loads, then the battery is not provided with the maximum power that the battery is structured to absorb. If the battery is not absorbing the maximum amount of power it is capable of, the result is extra diesel fuel usage which could have been avoided.

Figure 2:
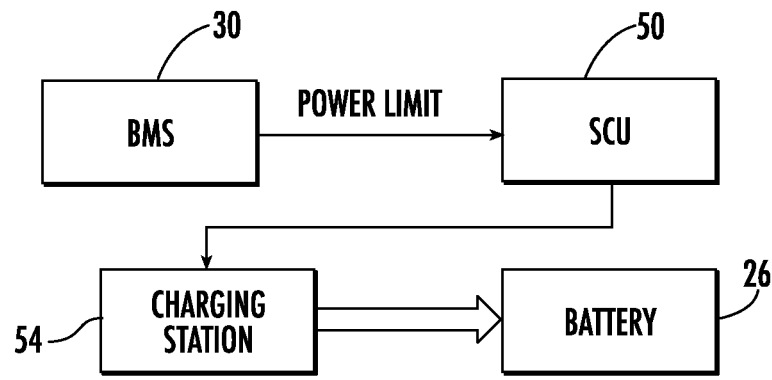
FIG. 2 is a schematic representation of a charging mode of the series hybrid power system of FIG. 1, according to some embodiments.

As shown in FIG. 2, during a recharge with no parasitic loads, the battery management system 30 broadcasts the battery power limit to the hybrid control circuit 50. The battery power limit is then summed with the parasitic power load (e.g., zero when no parasitic loads are present) to determine the total power limit. The total power limit is then communicated from the hybrid control circuit 50 to a charging source 54. In some embodiments, the charging source 54 is the engine 34 and the generator 42. In some embodiments, the charging source 54 is a grid power source. In some embodiments, the charging source 54 is regenerative power produced by the traction motor 14. The charging source 54 receives the total power limit, and provides power to the hybrid power system 10 at or below the total power limit. In the example shown in FIG. 2, where no parasitic loads are present, the total power limit is substantially equal to the total power limit and substantially all the power provided from the charging source 54 is directed to the battery 26.

Figure 3:
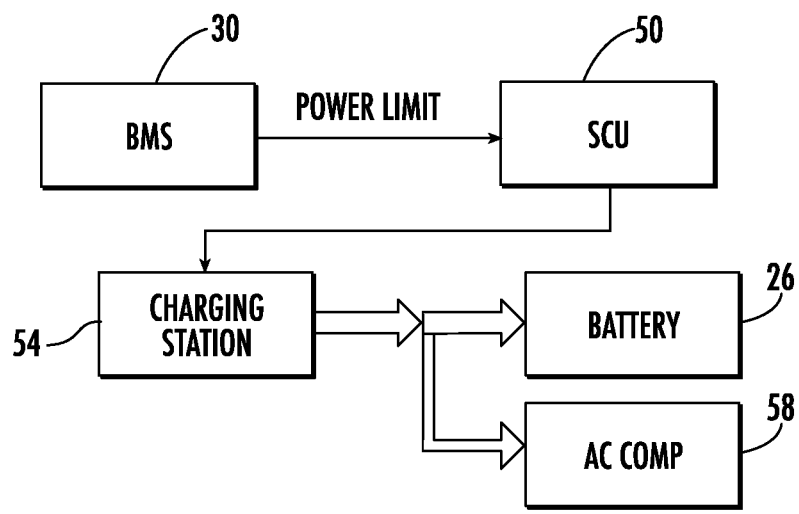
FIG. 3 is a schematic representation of a charging mode of a hybrid power system, according to some embodiments.

As shown in FIG. 3, in prior systems that failed to account for the parasitic power load, the hybrid control circuit 50 would simply communicate the battery power limit to the charging source 54. Then, the charging source 54 would provide power to the hybrid power system 10 at or below the battery power limit. Parasitic loads 58 then use a portion of the available power, leaving a resultant power to charge the battery 26 that is less than the battery power limit. In FIG. 3, the relative size of the arrows indicates the amount of power transmitted.

Figure 4:
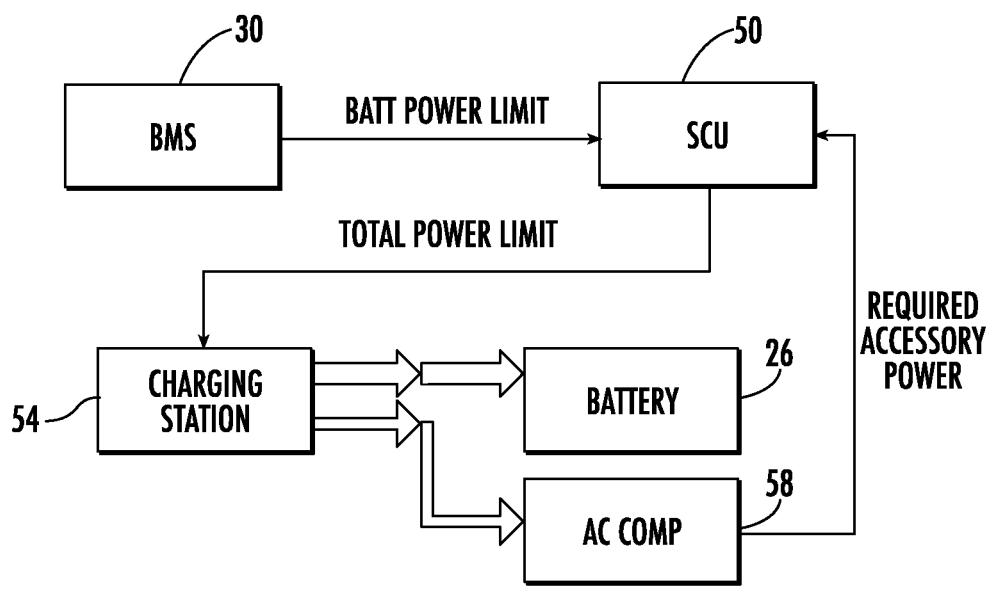
FIG. 4 is a schematic representation of another charging mode of the series hybrid power system of FIG. 1, according to some embodiments.

As shown in FIG. 4, the hybrid power system 10 utilizes the total power limit that accounts for the parasitic power load of the vehicle load 18. The battery management system 30 broadcasts the battery power limit, the hybrid control circuit 50 sums the battery power limit with the parasitic power load, and determines the total power limit. The total power limit is then broadcasted to the charging source 54. The charging source 54 receives the total power limit and provides power to the hybrid power system 10 at or below the total power limit. As shown in FIG. 4, the parasitic loads of the vehicle load 18 are operated simultaneously during the charging action, but the battery 26 still receives power up to the battery power limit and charges at an improved rate.

It is important to note that the required power for the accessories (i.e., the parasitic power load) is not limited to HVAC compressors, fans, pumps, power steering pump, electric lighting, and/or service brake compressors. Other components and power draws can add to the parasitic power load and be accounted for within the total power limit.

The parasitic power load may be received via CAN message from a smart device or it may be measured by the hybrid control circuit 50 by voltage and/or current measurements directly. For example, the hybrid power circuit 50 can monitor a DC→AC inverter 54 (see FIG. 5), a DC→DC converter 58 (see FIG. 5), and/or other components to determine the parasitic power load.

While FIG. 4 shows two power flows (one to the battery 26 and one to the parasitic load 58), because the power from the charge source 54 manifests as voltage on a high voltage bus, there is only one flow from the charge source 54 to the hybrid power system 10 and the charge source 54 has no control over where that power subsequently goes. The hybrid control circuit 50 is structured to divert power, as desired. In some embodiments, the hybrid control circuit 50 broadcasts the total power limit during a bulk charging phase and does not broadcast the total power limit during an adsorptive phase. In some embodiments, the battery power limit is broadcast during the adsorptive phase.

Figure 5:
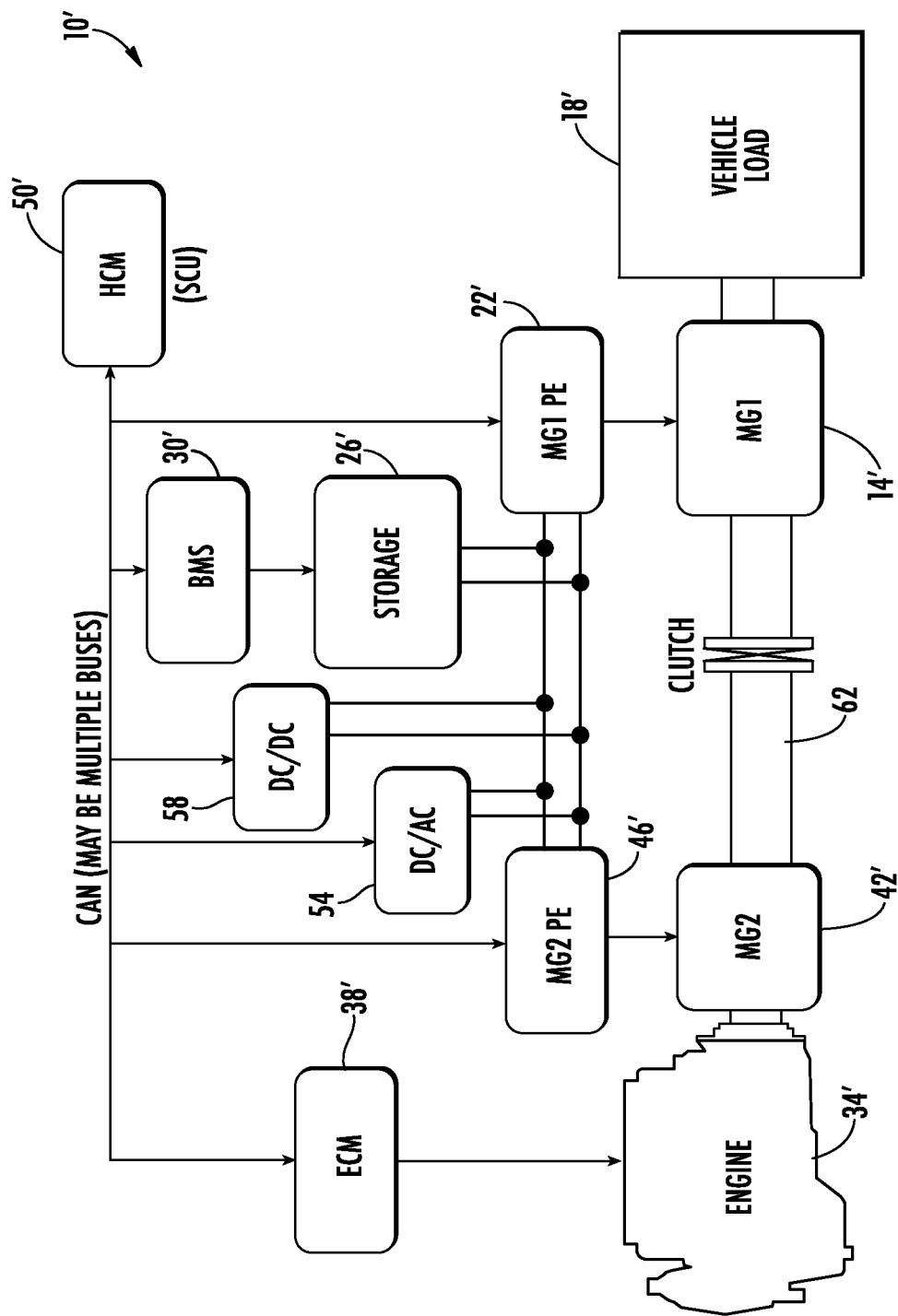
FIG. 5 is a schematic representation of a parallel hybrid power system according to some embodiments.

The hybrid power system 10 shown in FIG. 1 is depicted as a series hybrid system where substantially all power provided to the vehicle load 18 is produced by the traction motor 14. As shown in FIG. 5, a hybrid power system 10' that is similar to the hybrid power system 10 can be arranged as a parallel hybrid system wherein the engine 34' is capable of powering the vehicle load 18' via a clutch 62 when the battery's 26 state-of-charge is sufficiently depleted. The hybrid power system 10' is numbered with like reference numbers in the prime series and operates in a manner consistent with the above description. In some constructions, the DC→AC inverter 54 receives power from a high voltage DC bus and transforms the power to 230 volt alternating current for use by vehicle systems such as the HVAC. In some embodiments, the DC→DC converter 58 converts the voltage of the high voltage bus to 24 volts for use by low voltage systems.

Figure 6:
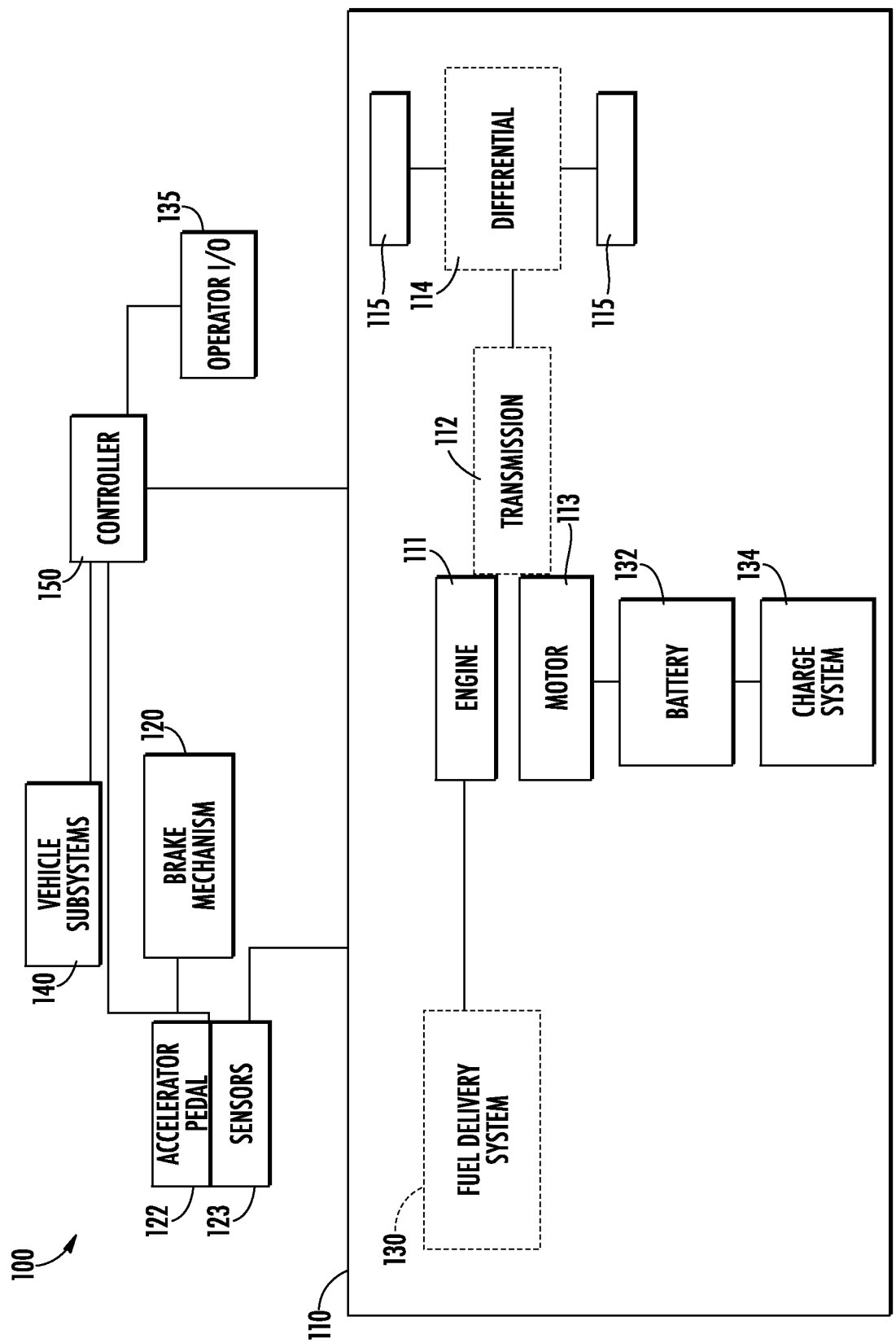
FIG. 6 is a schematic block diagram of an example electric vehicle according to an example embodiment.
Figure 7:
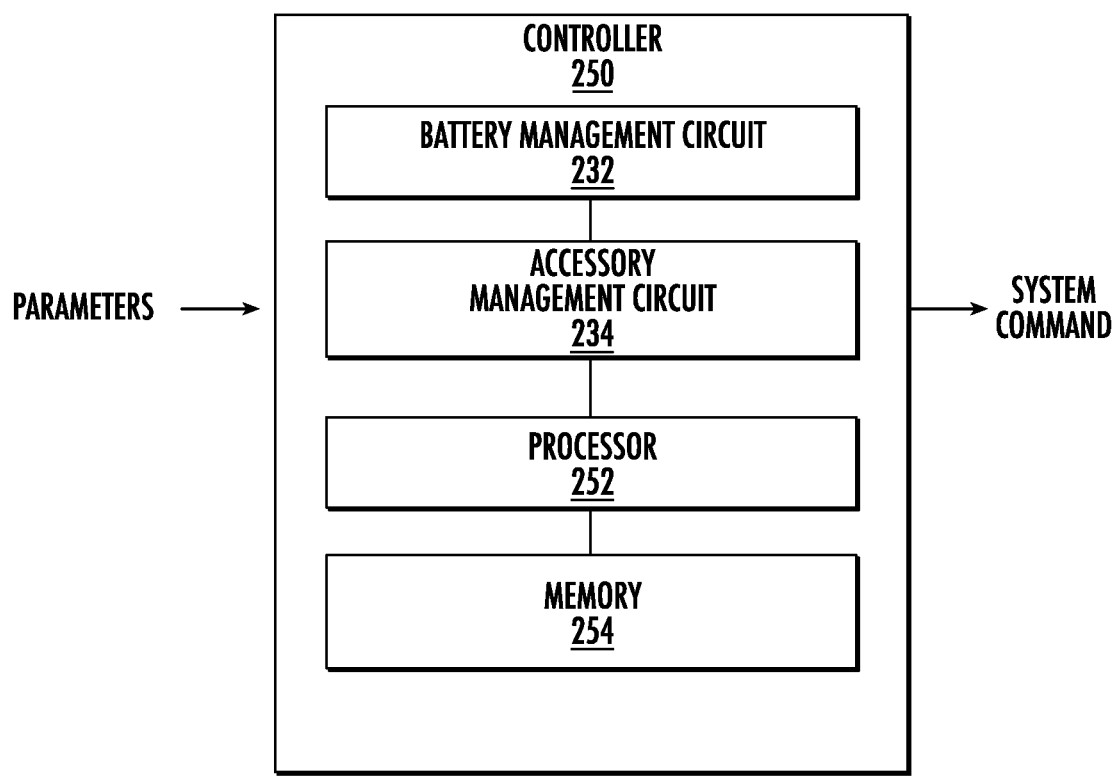
FIG. 7 is a schematic diagram of an example controller that may be used with the systems of FIG. 6.
Figure 8:
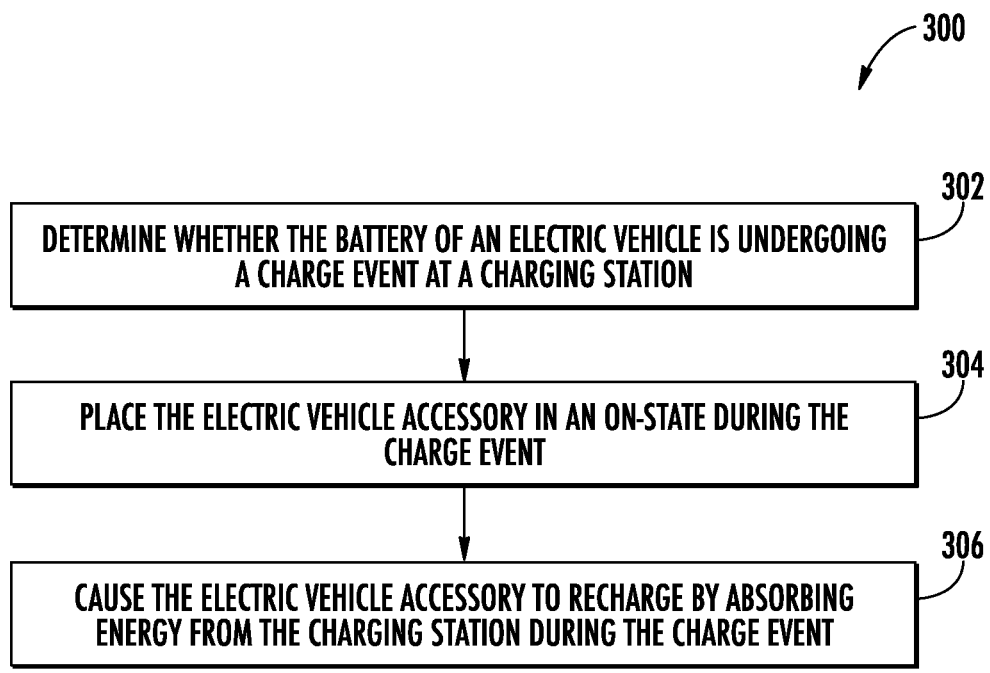
FIG. 8 is a schematic diagram of a flowchart of a method recharging an electric vehicle accessory of an electric vehicle during a charge event, according to an example embodiment.

Referring to FIGS. 6-8, the various embodiments disclosed herein relate to a system and method for recharging an electric vehicle accessory of an electric vehicle during a charge event. According to the present disclosure, a controller determines whether the battery of an electric vehicle is undergoing a charge event at a charging station; and while the battery of the electric vehicle is undergoing the charge event, the controller generates a command structured to place the electric vehicle accessory in an on-state during the charge event; and causes the electric vehicle accessory to recharge by absorbing energy from the charging station during the charge event. Recharging an electric vehicle accessory in addition to a vehicle battery during a charge event increases fuel savings, extends the charge range of the battery, and improves the utilization of untapped charging station capacity.

FIG. 6 depicts a schematic block diagram of an example electric vehicle 100 according to an example embodiment. The electric vehicle 100 may be a vehicle, such as, but not limited to, a plug-in electric vehicle (EV, electric car, etc.), battery electric vehicle (BEV), fuel cell electric vehicle (FCEV), hybrid electric vehicle (HEV), plug-in hybrid electric vehicle (PHEV), range-extended electric vehicle (REEV), extended-range electric vehicle (E-REV), range-extended battery-electric vehicle (BEVx), or other vehicle powered by or otherwise operable via at least one of a battery (e.g., the battery 132), generator (e.g., a power generator, generator plant, electric power strip, on-board rechargeable electricity storage system, etc.), an engine, a motor (e.g., an electric motor, traction motor, motor-generator unit, etc.), etc. The electric vehicle 100 may be operable, powered, plugged-in, or otherwise charged via a charging station (e.g., an off-board electric power source, electrical grid, etc.). Alternatively or additionally, the electric vehicle 100 may be operable, powered, or otherwise charged via an engine 111 (e.g., an internal combustion engine) and/or a battery (e.g., the battery 132). The electric vehicle 100 may be operable in series (e.g., utilizing a single path that powers the wheels of the vehicle and a plurality of energy sources) or in parallel (e.g., utilizing an engine path and an electrical path to power the wheels of the vehicle). The electric vehicle 100 may be an on-road or off-road vehicle including, but not limited to, cars, trucks, trains, ships, boats, vans, airplanes, spacecraft, or any other type of vehicle.

The electric vehicle 100 is shown to generally include a controller 150 communicably and operatively coupled to a battery 132 and an electric vehicle accessory. As used herein, the term "electric vehicle accessory" may be used to refer to an air compressor, a temperature control system (e.g., a heating, ventilation and air conditioning (HVAC) system, engine cooling system, motor cooling system, battery cooling system, etc.), an electric drive system, a power system, and/or any other vehicle system and/or component that is structured to store energy. The controller 150 is structured to determine whether the battery 132 of an electric vehicle (e.g., the electric vehicle 100) is undergoing a charge event at a charging station (e.g., an electric recharging point, charging point, electric vehicle charging station, etc.). While the battery 132 of the electric vehicle is undergoing the charge event, the controller 150 may generate a command structured to place the electric vehicle accessory in an on-state during the charge event and cause the electric vehicle accessory to recharge by absorbing energy from the charging station during the charge event.

It should be understood that the electric vehicle 100 may include additional, less, and/or different components/systems than depicted in FIG. 6, such that the principles, methods, systems, apparatuses, processes, and the like of the present disclosure are intended to be applicable with any other vehicle configuration. It should also be understood that the principles of the present disclosure should not be interpreted to be limited to on-highway vehicles; rather, the present disclosure contemplates that the principles may also be applied to a variety of other applications including, but not limited to, off-highway construction equipment, mining equipment, marine equipment, locomotive equipment, etc.

The battery 132 may be structured to provide energy that permits the electric vehicle to run from a calibratable floor (e.g., 5 miles) to a calibratable ceiling (e.g., 250 miles). The battery 132 may be structured to receive a rapid charge. In examples wherein the battery 132 may be depleted, the battery may recharge according to a calibratable time period (e.g., 30 minutes to 24 hours). The charge system 134 may be structured to recharge the battery 132. In some embodiments, the charge system provides electrical energy to the battery 132. Alternatively or additionally, the charge system 134 may be structured to monitor the battery voltage, current flow, and/or temperature of the battery 132 to minimize charging time. The charge system 134 may transmit or otherwise provide current to the battery 132 without increasing the battery temperature beyond a tolerable range.

The electric vehicle accessory may include an air compressor, a temperature control system (e.g., a heating, ventilation and air conditioning (HVAC) system, engine cooling system, etc.), an electric drive system, a power system, and/or any other vehicle system and/or component that is structured to store energy. The air compressor may store pneumatic energy. The HVAC system may store thermal energy by excess heating or excess cooling a compartment (e.g., the passenger compartment) or other area of the electric vehicle 100. The engine cooling system may store thermal energy by excess cooling the engine 111. Such electric vehicle accessories require energy to operate. In this regard, an electric vehicle accessory load on the engine 111 and/or the electric vehicle 100 may perform a function that represents energy translation. The energy translation has a degree of energy storage capability such that the excess charging station power may recharge (e.g., charge or otherwise top-off) the electric vehicle accessory while connected to the charging station (e.g., while connected to the grid).

In some embodiments, the controller 150 may be communicatively coupled to a brake mechanism 120 (e.g., a brake, braking system, or any other device configured to prevent or reduce motion by slowing or stopping components (e.g., a wheel, axle, pedal, etc. of a vehicle)), a fuel delivery system 130, a powertrain system 110, an operator input/output (I/O) device 135, and one or more additional vehicle subsystems 140. In some embodiments, the battery 132 of the electric vehicle 100 may be recharged in part by regenerative braking in response to electricity generated from the energy that may be lost when braking.

The powertrain system 110 facilitates power transfer from the motor 113 and/or the battery 132 to power the electric vehicle 100. In an example embodiment, the electric vehicle (e.g., an electric drive vehicle or any other vehicle that is propelled by an electric motor or traction motor) may be operable via a powertrain system 110 which includes a motor 113 operably coupled to a battery 132 and charge system 134. The motor 113 transfers power to the final drive (shown as wheels 115) to propel the electric vehicle 100. As depicted, the powertrain system 110 includes various components that may be included in an electric vehicle 100, such as for example, an engine 111 operably coupled to a transmission 112, a motor 113, and a differential 114, where the differential 114 transfers power output from the engine 111 to the final drive (shown as wheels 115) to propel the electric vehicle 100. As a brief overview and in this configuration, the controller 150 of the electric vehicle 100 provides electricity to the motor 113 (e.g., an electric motor) in response to input received by the controller 150 from the accelerator pedal 122, charge system 134 (e.g., a battery charging system, rechargeable battery, etc.), etc. In some embodiments, the electricity provided to power the motor 113 may be provided by the controller (e.g., the controller 150), the battery 132, an onboard gasoline-engine generator, a hydrogen fuel cell, etc.

In some embodiments, the electric vehicle 100 may also include the engine 111 which may be structured as an internal combustion engine that receives a chemical energy input (e.g., a fuel such as natural gas, gasoline, ethanol, or diesel) from the fuel delivery system 130, and combusts the fuel to generate mechanical energy, in the form of a rotating crankshaft. The transmission 112 receives the rotating crankshaft and manipulates the speed of the crankshaft (e.g., the engine speed, which is usually expressed in revolutions-per-minute (RPM)) to effect a desired drive shaft speed. A rotating drive shaft may be received by a differential 114, which provides the rotation energy from the drive shaft to the final drive 115. The final drive 115 then propels or moves the electric vehicle 100. Further, the drive shaft may be structured as a one-piece, two-piece, and/or a slip-in-tube driveshaft based on the application.

In some examples, the electric vehicle 100 may include the transmission 112. The transmission 112 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (e.g., gears, for a geared transmission) that affect different output speeds based on the engine speed. Like the engine 111, the transmission 112, motor 113, differential 114, and final drive 115 may be structured in any configuration dependent on the application (e.g., the final drive 115 may be structured as wheels in an automotive application and a propeller in an airplane application).

The electric vehicle 100 may include a throttle system (e.g., a throttle system including an intake manifold throttle) depending on the engine system utilized. The throttle system generally includes a throttle valve (e.g., a ball valve, a butterfly valve, a globe valve, or a plug valve), which in certain embodiments is operatively and communicably coupled to an accelerator pedal 122 and/or one or more sensors 123. The throttle valve is structured to selectively control the amount of intake air provided to the engine 111. Because the type of engine 111 may vary from application-to-application, the type of throttle valve may also vary with all such possibilities and configurations falling within the spirit and scope of the present disclosure. The term "throttle system" as used herein should be understood broadly, and may refer to any air management system, including without limitation an intake throttle, an exhaust throttle, and/or manipulations of an air handling device such as a turbocharger (e.g., a wastegate turbocharger and/or a variable geometry turbocharger). The throttle system may additionally or alternatively be active during stoichiometric-like operations of the engine, and inactive or less active during lean burn-like operations of the engine.

The accelerator pedal 122 may be structured as any type of torque and/or speed request device included with a system (e.g., a floor-based pedal, an acceleration lever, etc.). Further, the sensors 123 may include any type of sensors communicatively coupled to the battery 132, charge system 134, accelerator pedal 122, or any other component and/or system included in the electric vehicle 100. For example, the sensors 123 may include a charge air temperature sensor, a coolant temperature and pressure sensor, an ambient air temperature and pressure sensor, and the like.

As depicted, the electric vehicle 100 includes the operator I/O device 135. The operator I/O device 135 enables an operator of the vehicle to communicate with the electric vehicle 100 and the controller 150. Analogously, the I/O device 135 enables the vehicle or controller 150 to communicate with the operator. For example, the operator I/O device 135 may include, but is not limited to, an interactive display (e.g., a touchscreen, etc.) having one or more buttons/input devices, haptic feedback devices, an accelerator pedal, a brake pedal, a shifter for the transmission, a cruise control input setting, a navigation input setting, etc. Via the I/O device 135, the controller 150 can also provide commands/instructions/information to the operator (or a passenger).

As also shown, the electric vehicle 100 includes one or more vehicle subsystems 140. The various vehicle subsystems 140 may generally include one or more sensors (e.g., a charge sensor, speed sensor, torque sensor, ambient pressure sensor, temperature sensor, etc.), as well as any subsystem that may be included with a vehicle. Accordingly, in an embodiment including a hybrid electric vehicle, the subsystems 140 may also include an exhaust aftertreatment system structured to reduce diesel exhaust emissions, such as a selective catalytic reduction catalyst, a diesel oxidation catalyst (DOC), a diesel particulate filter (DPF), a diesel exhaust fluid doser with a supply of diesel exhaust fluid, and a plurality of sensors for monitoring the exhaust aftertreatment system (e.g., a NOx sensor).

The controller 150 may be communicably and operatively coupled to the battery 132, charge system 134, electric vehicle accessory, powertrain system 110, brake mechanism 120, accelerator pedal 122, the operator I/O device 135, and/or one or more vehicle subsystems 140. Communication between and among the components may be via any number of wired or wireless connections (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data. Because the controller 150 is communicably coupled to the systems and components in the electric vehicle 100 of FIG. 6, the controller 150 is structured to receive data (e.g., instructions, commands, signals, values, etc.) from one or more of the components shown in FIG. 6. The controller 150 is communicatively coupled to or may take the form of, for example, a controller 250 as described herein with reference to FIG. 7.

FIG. 7 illustrates a schematic diagram of an example controller 250 that may be used with the systems of FIG. 6. The controller 250 may be communicatively coupled to, or included within, the electric vehicle 100. The controller may be included in the charging station and/or in the electric vehicle 100. The controller 250 may include a processor 252 such as, but not limited to, a microprocessor, programmable logic controller (PLC) chip, an ASIC chip, or any other suitable processor. The processor 252 which is in communication with the memory 254 is structured to execute instructions, algorithms, commands or programs stored in the memory. The memory 254 includes any of the memory and/or storage components discussed herein. For example, the memory 254 may include RAM and/or cache of the processor. The memory 254 may also include one or more storage devices (e.g., hard drives, flash drives, computer readable media, etc.) either local or remote to the controller 250. The memory is structured to store look up tables, algorithms, or instructions. Although a single controller 250 is shown, some example configurations may include a plurality of controllers. Accordingly, as the components of FIG. 6 are shown to be embodied in an electric vehicle 100, the controller 250 may be structured as, include, or be communicably and operatively coupled to at least one of a battery controller, electric vehicle accessory controller, power electronics system, motor controller, powertrain system controller, engine controller, etc.

The controller 250 (e.g., a battery controller) may be structured to control, monitor, or otherwise manage the battery 132. For example, the battery controller may maintain values indicating the charge state of the battery 132. The values indicating the charge state may be stored in or otherwise accessed via the memory 254. The controller 250 may monitor the battery 132 of the electric vehicle 100 via a battery management circuit 232. In turn, the controller 250 may be structured to recharge the battery 132 during a charge event. The controller 250 may generate a command that takes power from the battery 132 and delivers it to the motor 113. The accelerator pedal 122 may be coupled to one or more potentiometers (e.g., a variable resistor) that generates a signal to the controller 250 to indicate the amount of power (e.g., zero power, full power, or an amount between zero and full power) that is to be delivered.

The controller 250 may be structured to control, monitor, or otherwise manage an electric vehicle accessory (e.g., a compressor, temperature control system, electric drive system, power system, or a combination thereof). For example, the controller 250 may maintain values indicating the storage capacity of the electric vehicle accessory. The values indicating the storage capacity may be stored in or otherwise accessed via the memory 254. The controller 250 may monitor the electric vehicle accessory of the electric vehicle 100 via an accessory management circuit 234. In turn, the controller 250 may be structured to recharge the electric vehicle accessory during a charge event. In some examples, the controller 250 may generate a command that takes electrical energy from the charging station and delivers it to the electric vehicle accessory.

The controller 250 (e.g., an engine controller) may be structured to control the engine 111 and/or the generator in examples wherein the electric vehicle 100 comprises a hybrid vehicle. In some embodiments, the controller 250 may be communicatively coupled to a power electronics system such that the controller 250 and the power electronics system may control the engine 111 and the generator. The power electronics system may provide data to and/or receive commands from the controller 250 regarding how much power (e.g., the power amount) may be requested from the engine 111 and the generator to supplement the battery 132. In some embodiments, the power electronics system may be structured to control the motor 113. The power electronics system may receive commands from the controller 250 regarding the amount of torque or power that may be required via the motor 113.

The controller 250 may be structured to receive one or more operating parameters associated with the battery 132. The operating parameters may be received from various components, circuits, controllers, systems, etc. that may be internal and/or external to the battery 132, the electric vehicle accessory, and/or the electric vehicle 100. The operating parameters may include the amount of charge, amount of energy storage, charge duration, charge limitation, grid load, time of operation relative to a route or path, route data, vehicle grade sensor data, vehicle weight, ambient conditions, or a combination thereof.

FIG. 8 is a flow diagram of an example process 300 for a controller to control an electric vehicle accessory of an electric vehicle (e.g., the electric vehicle 100) during a charge event via the circuits and other components described herein with reference to FIG. 7.

At 302, the process 300 includes determining whether the battery of an electric vehicle is undergoing a charge event at a charging station. The charging station (e.g., an electric vehicle charging station, charging point, electric recharging point, etc.) generates or otherwise supplies electric energy to recharge an electric vehicle, such as the electric vehicle 100. The charging station may be communicatively coupled to, or otherwise may comprise, a public charging station, residential charging station, electrical grid, battery switching station, and/or any other station structured to supply electrical energy to the electric vehicle 100. In some embodiments, the charging station may be configured to supply, via one or more connectors of the charging station, a rapid charge to the battery 132 and/or the electric vehicle accessory. For example, the charging station may supply a rapid charge at an increased voltage (V) and/or current (Amp). The charging station may have greater electrical capacity than the battery 132 needs or is capable of accepting such that the charging station may be used to power the electric vehicle accessory alternatively to, or in addition to, charging the battery 132. In determining that the battery 132 of the electric vehicle 100 is undergoing a charge event after the charging station and the electric vehicle 100 have been connected (e.g., physically connected), the charging station may apply a pulse width modulation (PWM) signal to initiate the supply of current (Amp) which results in the charge event (e.g., the charging of the battery 132 and/or the electric vehicle accessory).

While the battery 132 of the electric vehicle is undergoing the charge event, the accessory management circuit 234 may generate a command (e.g., a code) structured to move an electric vehicle accessory (e.g., a compressor, temperature control system, electric drive system, power system, or a combination thereof) into an on-state during the charge event at 304. The command may communicate operating parameters to the electric vehicle accessory to actuate various components, circuits, or levers of the electric vehicle accessory to cause one or more system components to change from the off-state to the on-state. The command may adjust the energy output (e.g., the on-state and the off-state) of the electric vehicle accessory. For example, when the electric vehicle accessory is in the on state, the electric vehicle accessory may be powered on or otherwise utilize energy. In the on-state, the electric vehicle accessory may receive energy from the charging station responsive to the command generated to move the electric vehicle accessory to the on-state during the charge event. For example, the accessory management circuit 234 may generate a command (e.g., a code) structured to move the HVAC system into the on-state such that electrical energy is received from the charging station in response to the accessory being in the on-state.

At 306, the accessory management circuit 234 may be structured to cause the electric vehicle accessory to recharge by absorbing energy from the charging station during the charge event. As described herein, the battery 132 may be structured to receive a charge from the charging station. The electric vehicle accessory may be structured to receive a charge from the charging station while the battery 132 is charging. In some embodiments, the electric vehicle accessory may be structured to receive a charge from the charging station prior to the charging of the battery 132. Yet, in other embodiments, the electric vehicle accessory may be structured to receive a charge from the charging station after the battery 132 has been charged.

The battery management circuit 232 and/or the accessory management circuit 234 may be structured to set a recharge proportion based on a plurality of predetermined parameters and/or dynamically determined parameters such as, but not limited to, the amount of charge, charge duration, charge limitation, grid load, storage capacity, specifications, etc. of the electric vehicle accessory and/or the battery 132. The recharge proportion may include each respective fraction or proportion of the total capacity of electric energy that the charging station may provide to recharge the battery 132 and/or the electric vehicle accessory. The recharge proportion may be set by a controller based on a predetermined parameter. The predetermined parameter may be representative of a split recharge proportion (e.g., 70% of the total capacity may be directed towards the battery 132 and 30% of the total capacity may be directed towards the electric vehicle accessory) or a full recharge proportion (e.g., 100% of the total capacity may be directed towards the battery 132 or 100% of the total capacity may be directed towards the electric vehicle accessory). In some examples, the recharge proportion may be divided or otherwise split between the battery 132 and/or the electric vehicle accessory such that the battery 132 and/or the electric vehicle accessory may recharge and/or operate at the same or different time.

The accessory management circuit 234 may use the excess charging station power to recharge (e.g., charge or otherwise top off operation of) the electric vehicle accessory while connected to the charging station (e.g., while connected to the grid). In some examples, the electric vehicle accessory may be charged (e.g., recharged) to a calibratable capacity during the charge event such that the amount or level of charge executed may be scalable based on the parameters (e.g., the size, storage capacity, specifications, etc.) of the electric vehicle accessory. While the electric vehicle accessory is charging, the electric vehicle accessory may be structured to receive at least a portion of the current discharged during the charge event. For example, an air compressor for vehicle pneumatics may convert mechanical energy into pneumatic energy that may be stored in an air tank. In some examples, the air compressor may not currently store its maximum amount of compressed air, and/or the air compressor may not currently operate to compress more air. The air compressor may not be currently operating due to the pressure not falling below a threshold, a scheduled operation time other than the current time, etc. While the battery 132 is charging, the compressor be structured to operate to store up to the max amount of compressed air the compressor can store such that the compressor minimizes (e.g., does not use, or does not use as much) the use of electrical energy from the battery once the vehicle battery is no longer undergoing a charge event. Advantageously, the increased operation of the air compressor during the charge event may be offset by lighter or delayed operation of the air compressor after the charge event.

In some embodiments, as described herein, the electric vehicle accessory (e.g., the engine cooling system, motor cooling system, etc.) may be excess-cooled while the battery 132 of the electric vehicle is undergoing the charge event responsive to a command generated by the accessory management circuit 234. An electric vehicle accessory such as, for example, the engine cooling system or the motor cooling system regulates the thermal energy stored in each respective system. Increased cooling operation while the battery 132 of the electric vehicle is undergoing the charge event may be offset by lighter or delayed operation in the future.

Alternatively or additionally, an electric vehicle accessory such as the HVAC system (e.g., the passenger compartment HVAC system) may move to the on-state in response to a command generated by the accessory management circuit 234. While in the on-state, the HVAC system may be run or otherwise operated to take the interior temperature of the electric vehicle 100 to a maximum or minimum controlled temperature. Advantageously, the excess heating or cooling while the battery 132 of the electric vehicle is undergoing the charge event may offset or delay the HVAC system usage at some future time. To that end, operation of the HVAC system when the battery 132 of the electric vehicle is charging provides the means to offset increased operation while the battery 132 of the electric vehicle is undergoing the charge event with reduced operation at some point in the future.

By way of more specific example, in the context of an HVAC system, the energy from the charging station may be used to recharge the HVAC system, e.g., via excess heating or excess cooling of the passenger compartment. For example, the set point of the cabin temperature of an electric vehicle (e.g., a bus) may be 70 degrees. When the battery 132 undergoes a charge event, and the charging station has excess capacity, the excess electrical energy from the charging station may be converted to heat energy that heats the bus above the set point to, for example, 75 degrees (referred to herein as "excess heating of the passenger compartment"). The bus may then temporarily store the excess heat energy, which is ultimately dissipated over time. In some examples, the set point of the cabin temperature of an electric vehicle (e.g., a bus) may be 70 degrees. When the battery 132 undergoes a charge event, the excess electrical capacity at the charging station may be used to operate the cooling system to cool the electric vehicle below the set point (referred to herein as "excess cooling of the passenger compartment"). For example, the bus is now cooled to 65 degrees, such that the cooling system does not operate (or at least is operated to use less electrical energy from the battery 132) once the vehicle resumes normal driving operation (i.e., and is no longer undergoing a charge event and is no longer receiving electrical energy from the charging station). In this example, energy from the charging station is used to remove heat energy from the passenger compartment, and the passenger compartment effectively stores negative heat energy. In some examples, the accessory management circuit 234 may generate a command structured to move the engine cooling system into the on-state such excess energy from the charging station is received while the engine cooling system is on the on-state, such that the engine overcools.

Yet in other embodiments, the accessory management circuit 234 may generate a command structured to recharge the air compressor. For example, the accessory management circuit 234 may generate a command structured to the move the air compressor into the on-state. While in the on-state, the air compressor may store pneumatic energy responsive to the increased use of electric energy from the charging station (e.g., by running the air compressor and taking the air tank to full capacity). In the off-state, the electric vehicle accessory may be powered off or otherwise may not be utilizing energy.

Advantageously, utilizing the extra capacity of the charging station to maximize or otherwise top off accessory loads on the electric vehicle 100 results in energy provided to the electric vehicle accessory that does not have to be provided by, come out of, or derive from, the battery 132 that is being recharged.

While the battery 132 is charging during the charge event, the battery management circuit 232 may be structured to reduce the battery power to cool the battery 132. In such examples, the battery power may be moved to an off-state such that the battery power may be utilized later to, in turn, cause the battery 132 to cool. In some embodiments, the battery management circuit 232 and/or the accessory management circuit 234 may be structured to reduce the utilization of a fan (e.g., use the fan at a later time) to cool the battery 132.

In this regard, the battery management circuit 232 may be structured to receive one or more operating parameters associated with the battery 132. The one or more operating parameters may include parameters, such as, but not limited to the ambient temperature, duty cycle, or a combination thereof. The operating parameters may be received from various components, circuits, controllers, systems, etc. that may be internal and/or external to the battery 132, the electric vehicle accessory, and/or the electric vehicle 100 such as, but not limited to one or more sensors, telematics, etc. The battery management circuit 232 may be structured to determine whether to cool the battery 132 during the charge event based on the one or more operating parameters. If an operating parameter (e.g., the ambient temperature, duty cycle, etc.) is above an operation level, the battery management circuit 232 may be structured to cool the battery 132 (e.g., the battery packs) while connected to the charging station. The operation level (e.g., the temperature operation level of the battery 132) may run from a calibratable operation floor to a calibratable operation ceiling that may change based on the size, dimensions, specifications, and/or the various systems that interact with the battery 132. In some examples, the battery 132 may be cooled to meet a calibratable operation floor (e.g., an operating temperature between $-10°$ C. to $15°$ C.) such that the battery 132 may not be cooled to an operating temperature lower than the calibratable operation floor. If the ambient temperature and/or duty cycle is between the operation level and the calibratable operation floor (e.g., an operating temperature between $-10°$ C. to $15°$ C.), the battery 132 may be cooled according to a different programmatic cooling algorithm.

If the operating parameter is below the operation level, the battery 132 may be cooled according to a programmatic cooling algorithm structured to minimally cool the battery 132 or bypass the cooling of the battery 132. For example, the operating temperature range for a battery 132 to operate properly may be between $15$-$20°$ C. Accordingly, on a warm day, the temperature of the battery 132 may be cooled enough to stay under $20°$ C. On a cold day, the temperature of the battery 132 may be heated to a temperature above $15°$ C. Advantageously, minimally cooling the battery 132 from the energy provided by and/or at the charging station reduces the parasitic loads that consume energy from the battery 132. For example, if the battery 132 (e.g., the battery pack) is cooled to 15° C. or lower at the charging station, the time between the use of the battery cooling system may increase which saves the use of the energy from the battery 132 after the electric vehicle 100 has left the charging station. In examples in which there is a cold day, the battery 132 may be minimally cooled to a 20° C. target at the charging station since the battery 132 would stay cool without the cooling system.

As described herein the programmatic cooling algorithm may be selectable, utilized, or otherwise executed based on the operating parameters. For example, if a pickup and delivery vehicle is expecting to pick up a larger load, a more aggressive programmatic cooling algorithm may be selected. In other examples, if the route terrain, number of passengers, cabin HVAC needs, or other inputs indicate a larger load, a more aggressive programmatic cooling algorithm may be selected.

While FIGS. 1-5 are described together with respect to a first embodiment and while FIGS. 6-8 are described together with respect to a second embodiment, it will be appreciated that the embodiments of FIGS. 1-5 and FIGS. 6-8 are not mutually exclusive. The embodiments of FIGS. 1-5 and the embodiments of FIGS. 6-8 can be combined, in whole or in part, according to the spirit and scope of the present disclosure.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in the figures, it should be understood that systems disclosed herein may include any number of circuits for completing the functions described herein. For example, the activities and functionalities of the circuits 22, 30, 38, 46, 50, 232, 234 may be combined in multiple circuits or as a single circuit. Additional circuits with additional functionality may also be included. Further, the hybrid control circuit 50 and the controller 250 may further control other activity beyond the scope of the present disclosure.

As mentioned above and in one configuration, the "circuits" may be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The term "circuit" is meant to be broadly interpreted. In this regard and as mentioned above, the "circuit" may be implemented as one or more general-purpose processors, application specific integrated circuits (ASICs), field programmable gate arrays (FPGAs), digital signal processors (DSPs), very-large-scale integration (VLSI) circuits, off-the-shelf semiconductors such as logic chips, transistors, or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

A circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network. Where a circuit or portions of a circuit are implemented in machine-readable medium (or computer-readable medium), the computer readable program code may be stored and/or propagated in one or more computer readable medium(s).

The computer readable medium may be a tangible computer readable storage medium storing the computer readable program code. The computer readable storage medium may be, for example, but is not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on a RAM storage device for execution by the processor.

Computer readable program code for carrying out operations for aspects of the disclosed concepts may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus structured to control an electric vehicle accessory of an electric vehicle during a charge event, the apparatus comprising:
   a battery management system structured to control power flow to a battery;
   an inverter structured to power the electric vehicle accessory;
   a controller coupled to the battery and the electric vehicle accessory, the controller structured to:
      receive a battery power limit from the battery management system;
      receive an indication that the battery is undergoing the charge event;

cause the battery to charge by absorbing a first portion of power of a total amount of power from a charging station during the charge event, the first portion of the power at or below the battery power limit; and cause the electric vehicle accessory to charge by absorbing a second portion of power from the charging station during the charge event, responsive to the total amount of the power being above the battery power limit.

2. The apparatus of claim 1, wherein the controller is further structured to cause the battery and the electric vehicle accessory to charge concurrently.

3. The apparatus of claim 2, wherein the first portion of the power is less than the total amount of the power.

4. The apparatus of claim 1, wherein the electric vehicle accessory comprises at least one of a compressor, a cabin temperature control system, or an engine temperature control system.

5. The apparatus of claim 1, wherein the controller causes the electric vehicle accessory to be charged to a value less than or equal to a calibratable storage capacity during the charge event.

6. The apparatus of claim 5, wherein the controller is further structured to cause the battery to charge by absorbing the first amount of power from the charging station during the charge event and after the electric vehicle accessory has been charged to the calibratable storage capacity.

7. The apparatus of claim 1, wherein the controller is further structured to receive one or more operating parameters associated with the battery, the one or more operating parameters comprising at least one of an ambient temperature or a duty cycle.

8. The apparatus of claim 7, wherein the controller is further structured to cause a cooling of the battery during the charge event based on the one or more operating parameters.

9. A method comprising:
receiving, by a controller of an electric vehicle, a battery power limit of a battery of the electric vehicle;
receiving, by the controller, an indication that the battery of the electric vehicle is undergoing a charge event;
causing, by the controller, the battery to charge by absorbing a first portion of power of a total amount of power from a charging station during the charge event, the first portion of the power at or below the battery power limit and
causing, by the controller, an electric vehicle accessory of the electric vehicle to operate or charge by absorbing a second portion of power of the total amount of power from a charging station during the charge event, responsive to the total amount of the power being above the battery power limit.

10. The method of claim 9, further comprising charging, by the controller, the electric vehicle accessory to a value less than or equal to a calibratable storage capacity during the charge event.

11. The method of claim 10, further comprising causing, by the controller, the battery to charge by absorbing the first portion of the power from the charging station during the charge event after the electric vehicle accessory has been charged to the calibratable storage capacity.

12. The method of claim 9, further comprising receiving, by the controller, one or more operating parameters associated with the battery, the one or more operating parameters comprising at least one of an ambient temperature or a duty cycle.

13. The method of claim 9, further comprising causing, by the controller, the battery to charge by absorbing the first portion of the power from the charging station during the charge event while the electric vehicle accessory is operating or charging.

14. A non-transitory computer readable medium having computer-executable instructions embodied therein that, when executed by at least one processor of a computing system, cause the computing system to perform operations comprising:
receiving an indication that a battery of an electric vehicle is undergoing a charge event;
causing the battery to charge by absorbing a first portion of power of a total amount of power from a charging station during the charge event, the first portion of the power at or below a battery power limit; and
causing an electric vehicle accessory of the electric vehicle to operate or charge by absorbing a second portion of power of the total amount of power from the charging station during the charge event, responsive to the total amount of power being above the battery power limit.

15. The medium of claim 14, wherein the operations further comprise causing the battery and the electric vehicle accessory to charge concurrently.

16. The medium of claim 14, wherein the operations further comprise charging the electric vehicle accessory to a value less than or equal to a calibratable storage capacity during the charge event.

17. The medium of claim 16, wherein the operations further comprise causing the battery to charge by absorbing the first portion of the power from the charging station during the charge event and after the electric vehicle accessory has been charged to the calibratable storage capacity.

18. The medium of claim 14, wherein the operations further comprise receiving one or more operating parameters associated with the battery, the one or more operating parameters comprising at least one of an ambient temperature or a duty cycle.

19. The medium of claim 18, wherein the operations further comprise causing a cooling of the battery during the charge event based on the one or more operating parameters according to a cooling algorithm.

20. The medium of claim 14, wherein the operations further comprise at least one of:
causing the electric vehicle accessory to store thermal energy during the charge event; or
causing the electric vehicle accessory to store pneumatic energy in an air tank during the charge event.

* * * * *